United States Patent
Liang

(10) Patent No.: US 10,429,163 B2
(45) Date of Patent: Oct. 1, 2019

(54) RULER ASSEMBLY WITH MULTIPLE SCALES

(71) Applicant: Shang Chieh Liang, Taipei (TW)

(72) Inventor: Shang Chieh Liang, Taipei (TW)

( * ) Notice: Subject to any disclaimer, the term of this patent is extended or adjusted under 35 U.S.C. 154(b) by 190 days.

(21) Appl. No.: 15/782,840

(22) Filed: Oct. 12, 2017

(65) Prior Publication Data
US 2019/0113321 A1   Apr. 18, 2019

(51) Int. Cl.
*B43L 7/00* (2006.01)
*G01B 3/04* (2006.01)
*G01B 3/00* (2006.01)

(52) U.S. Cl.
CPC ............... *G01B 3/04* (2013.01); *G01B 3/004* (2013.01)

(58) Field of Classification Search
CPC ................................. G01B 3/004; G01B 3/006
USPC ...................................... 33/483–494
See application file for complete search history.

(56) References Cited

U.S. PATENT DOCUMENTS

| | | | | |
|---|---|---|---|---|
| 3,526,446 A * | 9/1970 | Saklem | ................. | G06G 1/065 116/323 |
| 4,024,831 A * | 5/1977 | Sperling | ................... | B43L 7/00 33/493 |
| 4,320,578 A * | 3/1982 | Ernst | ...................... | G01B 3/002 33/484 |
| 4,366,626 A * | 1/1983 | Livick | .................. | G09B 21/002 281/42 |
| 4,484,395 A * | 11/1984 | Samuels | .................. | G01B 3/04 33/494 |
| 4,654,976 A * | 4/1987 | Diwan | ................. | A47G 25/743 223/DIG. 1 |
| 4,757,616 A * | 7/1988 | Hills | ........................ | G01B 3/04 33/488 |
| 5,913,586 A * | 6/1999 | Marshall | ................ | G01B 3/004 33/494 |
| 6,606,796 B2 * | 8/2003 | Stoneberg | ................ | B43L 7/10 33/27.03 |
| 7,231,720 B2 * | 6/2007 | Allen | ....................... | B25H 7/04 33/41.6 |
| 7,513,056 B1 * | 4/2009 | Hobden | ................... | B25H 7/00 248/466 |
| 2002/0017031 A1 * | 2/2002 | Tarver, III | ............. | G01B 3/004 33/759 |
| 2008/0229598 A1 * | 9/2008 | Liu | .......................... | G01B 3/20 33/562 |
| 2009/0188123 A1 * | 7/2009 | Chou | ..................... | G01B 3/004 33/451 |
| 2013/0036618 A1 * | 2/2013 | Wall | ........................ | G01B 3/38 33/494 |

(Continued)

*Primary Examiner* — George B Bennett

(57) ABSTRACT

A ruler assembly with multiple scales includes a ruler being an oblong plate with a top surface and a bottom surface and four lateral sides between the top surface and the bottom surface; at least two sides of the top and bottom surfaces being formed with scales; and at least one an oblong hole penetrated through the ruler; at least one side of the oblong hole being formed with scales. The scales are units of length or units of scale ratios which shows the ratio of a measured length with respect to a real length, and in that the measured length is a length of an object which is reduced from an original object with a predetermined ratio; or a side of the oblong hole is formed as a drawing with non-straight sides so as to present a pattern.

12 Claims, 5 Drawing Sheets

(56) References Cited

U.S. PATENT DOCUMENTS

2014/0101952 A1\* 4/2014 Schmitten ............ B43L 13/001
            33/493
2015/0168119 A1\* 6/2015 French ................. G01B 3/1082
            33/494
2016/0245634 A1\* 8/2016 Burns .................... G01B 3/004

\* cited by examiner

RULER ASSEMBLY WITH MULTIPLE SCALES

FIELD OF INVENTION

The present invention relates to rulers, and in particular to a ruler assembly with multiple scales.

BACKGROUND OF INVENTION

Generally, a straight ruler serves to measure a length of an object and a scale ruler serves to measure a reduced size of a real object. Generally, a scale ruler has a triangular cross section and serves to measure a length of an object which is identical to an original object and is reduced with a predetermined ratio, and the scale ruler shows a real length of an original object as the scale ruler measures the reduced object. Generally, the unit of a scale ruler is ranged from 1/100 m to 1/600 m.

However, prices of scale rulers are expensive than the original straight measure ruler. Furthermore the scale rulers have only six units so that it cannot be widely used in various situations. Therefore, a user must prepare several scale rulers for practical usages, but this is non-economic and inconvenient in storage and carrying. Furthermore the triangular cross section of a scale ruler occupies a larger space.

SUMMARY OF THE INVENTION

To improve above defects in the prior art, the present invention provides a ruler assembly with multiple scales, wherein at least one oblong hole is formed in the ruler. Two sides of the rulers and two sides of the oblong ruler are formed with scales which are indicated by different units so that the ruler of the present invention can be used to measure an object by different units of length or different scale ratio as desired. Therefore, the user only needs to prepare one ruler for measuring an object with different length units. Furthermore, in one embodiment, one side of the rule is formed with a drawing which presents a beautiful outlook.

To achieve above object, the present invention provides a ruler assembly with multiple scales comprising: a ruler being an oblong plate with a top surface and a bottom surface and four lateral sides between the top surface and the bottom surface; at least two sides of the top and bottom surfaces being formed with scales; and an oblong hole penetrated through the ruler; at least one side of the oblong hole being formed with scales.

The scales are units of length or scale ratios which shows the ratio of a measured length with respect to a real length, and in that the measured length is a length of an object which is reduced from an original object with a predetermined ratio.

The ruler assembly with multiple scales further comprises another oblong hole which has at least one scale aside the oblong hole. Furthermore a side of the another oblong hole is formed as a drawing with non-straight sides so as to present a pattern. Or at least two scales are aside the oblong hole.

It may be that a side of the oblong hole is formed as a drawing with non-straight sides so as to present a pattern.

DETAILED DESCRIPTION OF THE INVENTION

With reference to FIGS. 1 to 9, a ruler assembly with multiple scales and decorations are illustrated. The present invention contains the following elements.

A ruler 10 is an oblong plate with a top surface and a bottom surface and four lateral sides between the top surface and the bottom surface. The top surface is formed with a scale 30. The scale 30 has indicated values. Preferable, the top or a bottom surface of the ruler 10 has two scales 30 which are at two opposite sides of the surface. Preferably, the scales are at long sides of the surface of the ruler 10. Furthermore the two scales 30 are different, that is, they are indicated by different units, for example, one by inches, and one by centimeters or by scale ratios (for example 1/100 m, 1/1000 m, 1/200 m, etc.) which shows the relation of a measured length with respect to a real length, and in that the measured length is a length of an object which is reduced from an original object with a predetermined ratio.

An oblong hole 20 is penetrated through the ruler 10. Two long sides of the oblong hole 20 are formed with scales 30. The units in the scales 30 aside the oblong hole 20 are different from those of the scales 30 at two sides of the top or bottom surface of the ruler 10.

Therefore, a user can measure an object using a desire scale by the ruler 10.

Preferably, a long side of the oblong hole 20 is parallel to the long side of the ruler 10.

Figure 1:
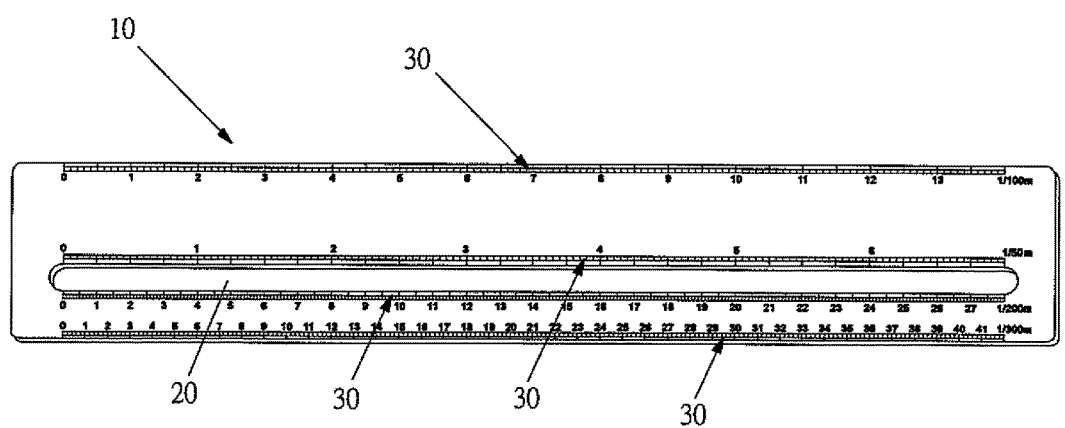
FIG. 1 is a top view of the first embodiment of the present invention.
Figure 2:
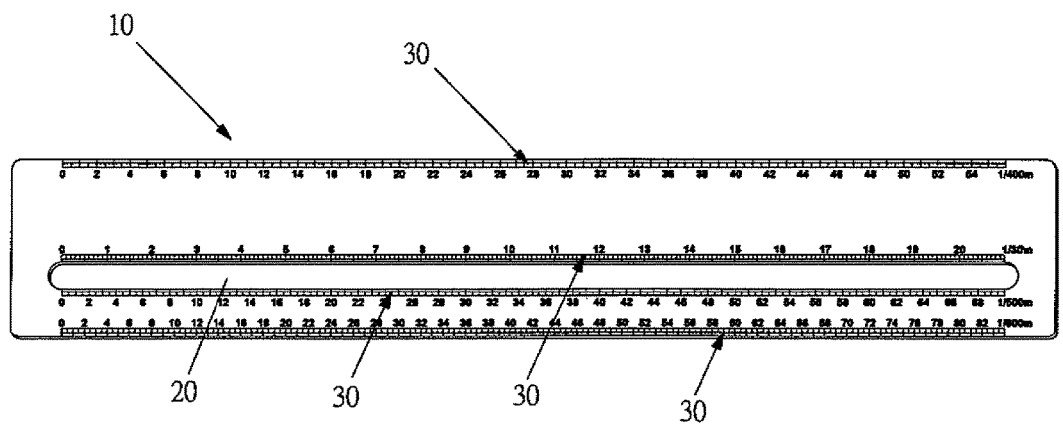
FIG. 2 is a bottom view of the first embodiment of the present invention.
Figure 3:
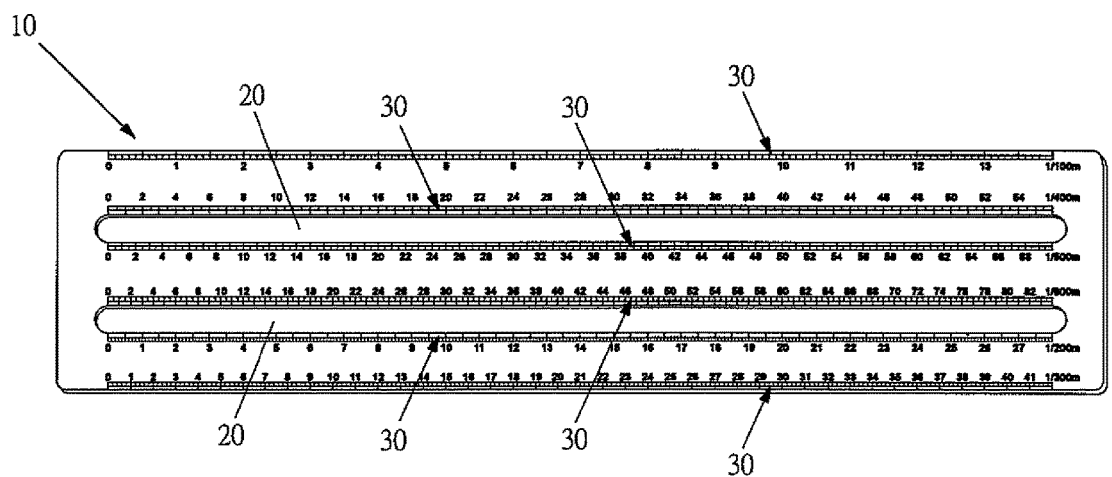
FIG. 3 shows another embodiment of the present invention.
Figure 4:
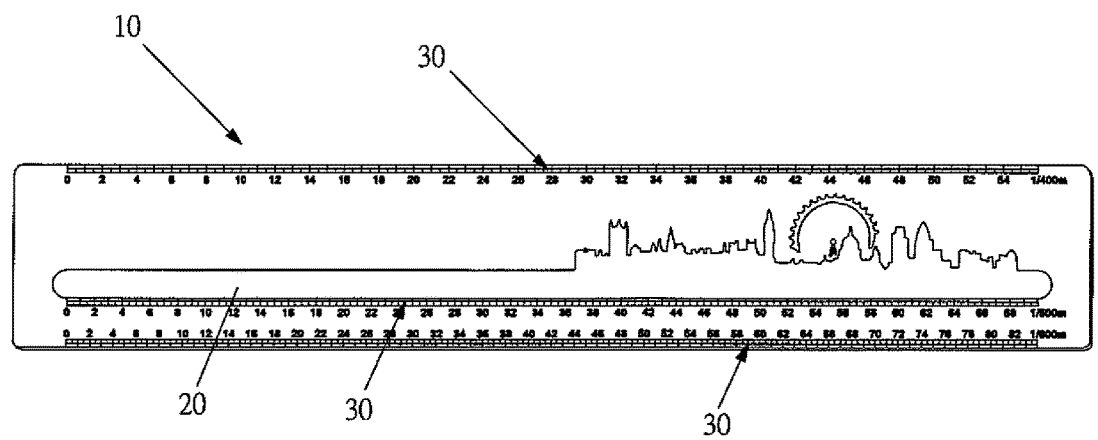
FIG. 4 shows a first example in the third embodiment of the present invention.
Figure 5:
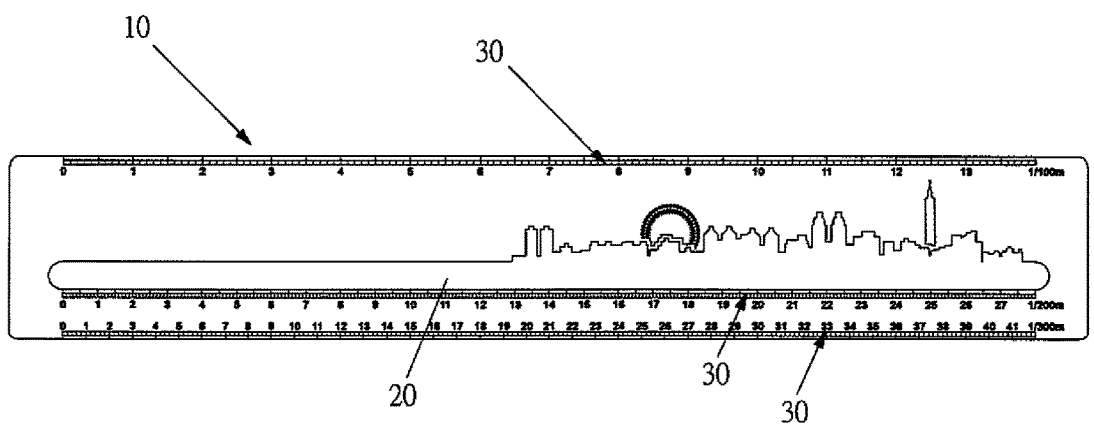
FIG. 5 shows a second example in the third embodiment of the present invention.
Figure 6:
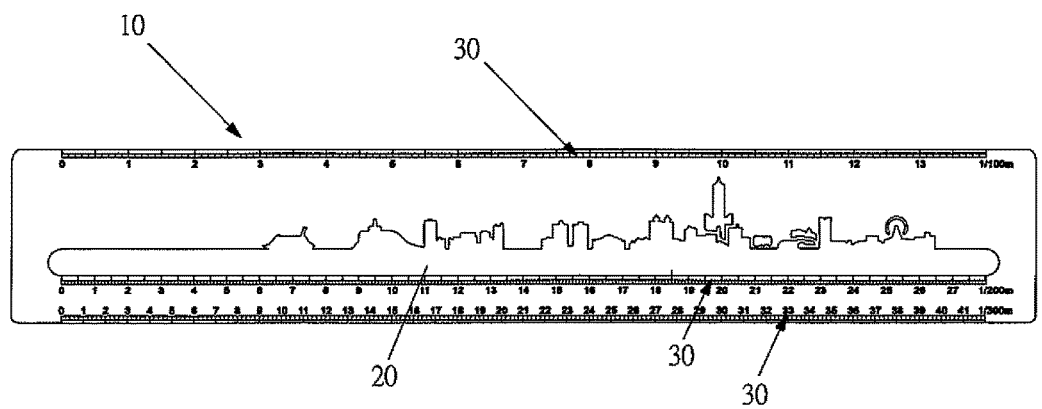
FIG. 6 shows a third example in the third embodiment of the present invention.
Figure 7:
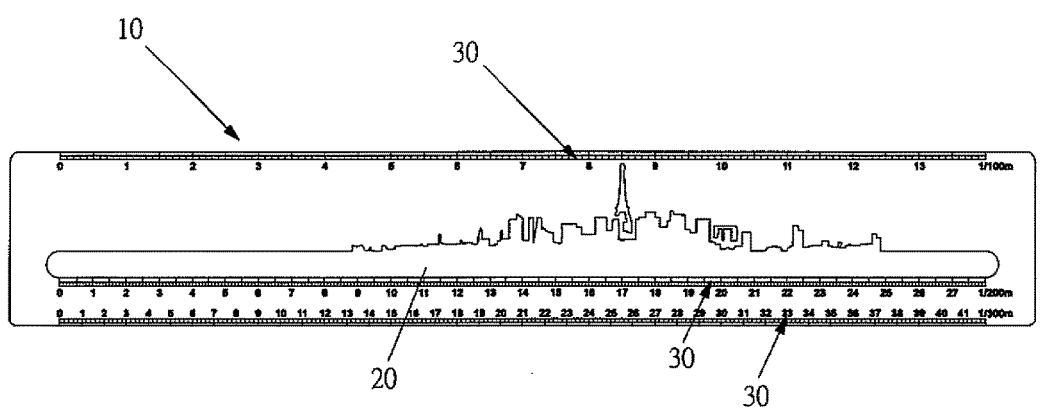
FIG. 7 shows a fourth example in the third embodiment of the present invention.
Figure 8:
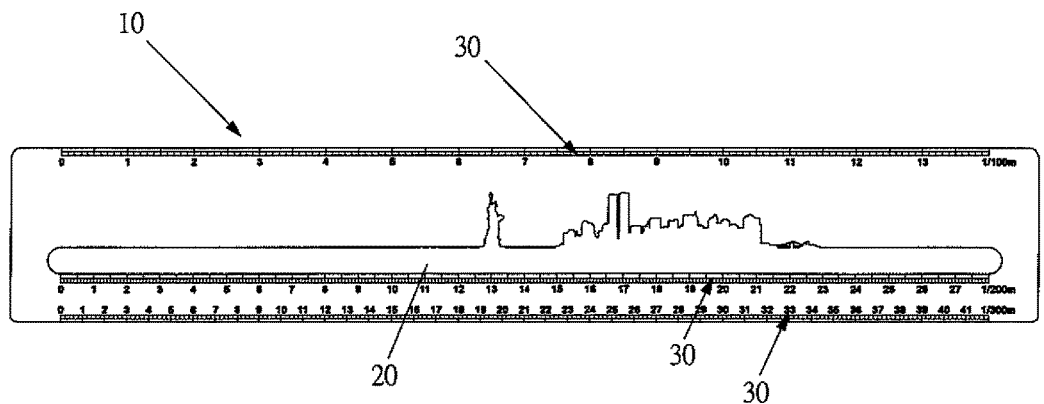
FIG. 8 shows a five example in the third embodiment of the present invention.
Figure 9:
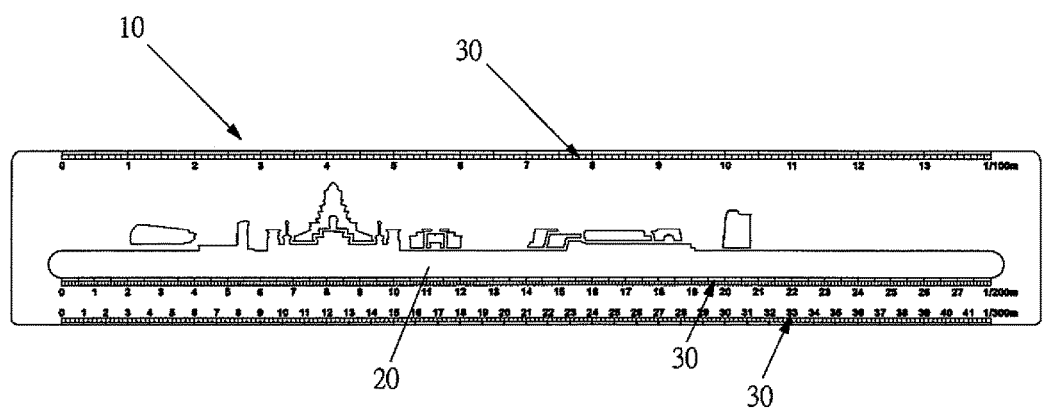
FIG. 9 shows a six example in the third embodiment of the present invention.

As illustrated in FIG. 3, it is illustrated there is a further oblong holes 30. Two opposite sides of each oblong hole 30 have scales 30 which are indicated by different units.

Referring to FIGS. 4 to 9, another embodiments of the present invention is illustrated. These embodiments are almost identical to that of the above embodiment, only that only one side of the oblong hole is formed with a scale which is indicated by units which are different from those shown on the two sides of the ruler 10, and a side of the oblong hole is formed as a drawing so as to present a beautiful pattern.

In the present invention, the ruler 10 is formed by plastics, metals, or hard papers.

Advantages of the present invention are that at least one oblong hole is formed in the ruler. Two sides of the rulers and two sides of the oblong ruler are formed with scales which are indicated by different units so that the ruler of the present invention can be used to measure an object by different units of length or different scale ratio as desired. Therefore, the user only needs to prepare one ruler for measuring an object with different length units. Furthermore, in one embodiment, one side of the rule is formed with a drawing which presents a beautiful outlook.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A ruler assembly with multiple scales comprising:
a ruler being an oblong plate with a top surface and a bottom surface and four lateral sides between the top surface and the bottom surface; at least two lateral sides of the top and bottom surfaces being formed with scales; and
an oblong hole penetrated through the ruler; at least one side of the oblong hole being formed with scales.

2. The ruler assembly with multiple scales as claimed in claim 1, wherein the scales are unit of lengths.

3. The ruler assembly with multiple scales as claimed in claim 1, wherein the scales are unit of scale ratios which shows the ratio of a measured length with respect to a real length, and in that the measured length is a length of an object which is reduced from an original object with a predetermined ratio.

4. The ruler assembly with multiple scales as claimed in claim 1, wherein at least one scale is units of length and at least one scale is unit of scale ratios which shows the ratio of a measured length with respect to a real length, and in that the measured length is a length of an object which is reduced from an original object with a predetermined ratio.

5. The ruler assembly with multiple scales as claimed in claim 1, wherein two scales on the sides of the top and the bottom surface are at opposite sides of the top and the bottom surface.

6. The ruler assembly with multiple scales as claimed in claim 1, further comprising a scale at one side of the oblong long hole; and two scales at sides of the oblong hole are at opposite sides of the oblong hole.

7. The ruler assembly with multiple scales as claimed in claim 1, wherein a long side of the oblong hole is parallel to a long side of the ruler.

8. The ruler assembly with multiple scales as claimed in claim 1, wherein a side of the oblong hole is formed as a drawing with non-straight sides so as to present a irregular figure.

9. The ruler assembly with multiple scales as claimed in claim 1, wherein a material of the ruler is selected from metals, plastics, and hard papers.

10. The ruler assembly with multiple scales as claimed in claim 1, further comprising another oblong hole which has at least one scale aside the oblong hole.

11. The ruler assembly with multiple scales as claimed in claim 10, wherein a side of the another oblong hole is formed as a drawing with non-straight sides so as to present a pattern.

12. The ruler assembly with multiple scales as claimed in claim 1, further comprising another oblong hole which has at least two scales aside the oblong hole.

* * * * *